(12) United States Patent
Eisenbraun et al.

(10) Patent No.: US 6,637,617 B2
(45) Date of Patent: Oct. 28, 2003

(54) INFLATABLE VEHICLE CUP HOLDER

(76) Inventors: Kenneth D. Eisenbraun, 485 N. Cranbrook Rd., Bloomfield Village, MI (US) 48301; Richard G. Leveille, 2864 Bardamar Dr., Fort Gratiot, MI (US) 48059

( * ) Notice: Subject to any disclaimer, the term of this patent is extended or adjusted under 35 U.S.C. 154(b) by 41 days.

(21) Appl. No.: 09/951,082

(22) Filed: Sep. 12, 2001

(65) Prior Publication Data

US 2002/0047018 A1 Apr. 25, 2002

Related U.S. Application Data

(60) Provisional application No. 60/231,797, filed on Sep. 11, 2000.

(51) Int. Cl.[7] ............................................... B65D 25/02
(52) U.S. Cl. .................... 220/720; 220/737; 248/311.2; 248/346.2; 224/906
(58) Field of Search ................................. 220/720, 723, 220/737, 722; 248/311.2, 316.1, 313, 346.2; 206/545, 522, 423; 224/906

(56) References Cited

U.S. PATENT DOCUMENTS

| | | | |
|---|---|---|---|
| 2,873,996 A | 2/1959 | McHugh, Jr. | |
| 3,831,995 A | 8/1974 | Duncan | |
| 4,581,915 A | 4/1986 | Haulsee et al. | |
| 4,941,635 A | 7/1990 | Lan | |
| 5,031,246 A | 7/1991 | Kronenberger | |
| 5,375,898 A | * 12/1994 | Ohmori et al. | ............ 294/27.1 |
| 5,536,056 A | * 7/1996 | Clarke et al. | ............ 294/119.3 |
| 5,626,224 A | 5/1997 | Clark et al. | |
| 6,302,364 B1 | * 10/2001 | Chiueh | ........................ 206/545 |

* cited by examiner

*Primary Examiner*—Lee Young
*Assistant Examiner*—Joseph C. Merek
(74) *Attorney, Agent, or Firm*—Gifford, Krass, Groh, Groh, Sprinkle, Anderson & Citkowski, P.C.

(57) ABSTRACT

An inflatable cup holder secures a variety of beverage container sizes and shapes. The cup holder includes a shell having an inner wall defining an internal bore, the inner wall having an aperture therein. An inflatable bladder adjacent to the aperture extends through the aperture and reduces the bore volume upon pressurization. An inflation device for pressurizing the bladder is located within the shell. A manual or air compressor inflation device operation are contemplated. A pressure release valve in full communication with the bladder prevents bladder inflation above a pre-selected threshold and also is activated to release a beverage container from the inventive cup holder.

20 Claims, 2 Drawing Sheets

INFLATABLE VEHICLE CUP HOLDER

RELATED APPLICATION

This application claims priority of U.S. Provisional Patent Application 60/231,797 filed Sep. 11, 2000.

FIELD OF THE INVENTION

The present invention relates generally to vehicular cup holders and, more particularly, to an inflatable cup holder having a pressurized air bladder.

BACKGROUND OF THE INVENTION

A cup holder is a ubiquitous feature in a modern vehicle. A motorist often consumes varied beverages during the course of the day while commuting. A cup holder is used to stabilize beverage containers as varied as disposable cups, soft drink bottles and cans, oversized beverage cups and mugs. The conventional vehicle cup holder is merely a depressed annular region. However, an invariant annular depression is necessarily too small to accommodate large containers or affords excessive movement to undersize containers. Regardless of whether a container is too large to fit in a cup holder or so small as to slosh. However, spillage is the inevitable result. The conventional recessed annular cup holder would be greatly improved if it were adjustable without the addition of space consuming complex mechanical devices. Thus, there exists a need for a compact vehicle cup holder that is adjustable to accommodate a variety of beverage container sizes.

SUMMARY OF THE INVENTION

An inventive cup holder includes a shell with an inner wall defining an internal bore. The internal bore has an aperture therein. An inflatable bladder adjacent to the aperture upon pressurization, thromboses and extends to the aperture into the bore to reduce internal bore size and thereby impinge upon a beverage container inserted within the internal bore. An inflation device for pressurizing the bladder is located within the shell of the cup holder. A shell outer wall can be adapted to insert within a recess.

The process for securing a beverage container includes the steps of inserting a beverage container into a cup holder and includes a shell having a wall defining an internal bore and an aperture in the inner wall, an inflatable bladder adjacent to the aperture and an inflation device for pressurizing the bladder to protrude through the aperture into the internal bore. The use of a pressure bladder to reduce the diameter of the cup holder to secure a variety of beverage containers is also detailed.

DETAILED DESCRIPTION OF THE INVENTION

Figure 1:
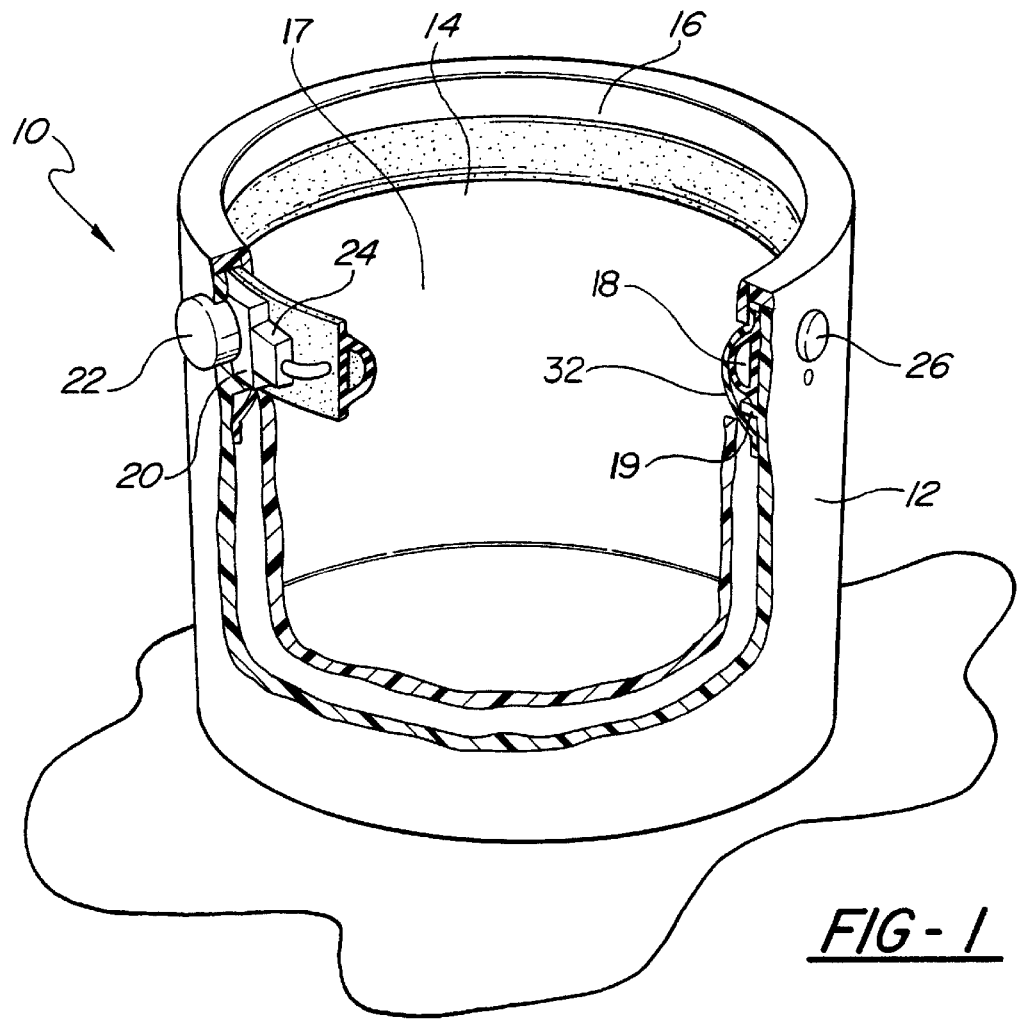
FIG. 1 is a partial cutaway view of a cup holder according to the present invention.
Figure 2:
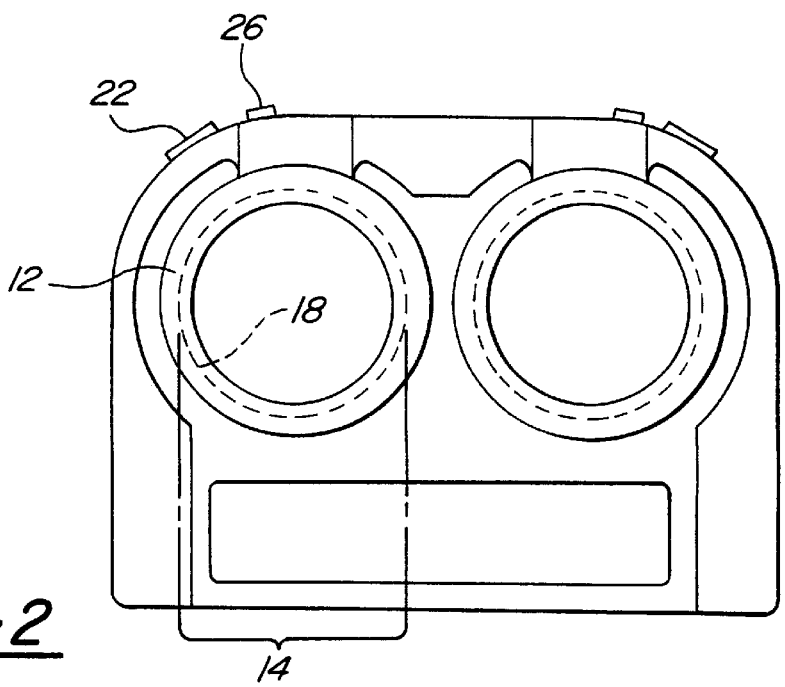
FIG. 2 is a top view of a console encompassing the embodiment depicted in FIG. 1.

The cup holder 10 as shown in FIGS. 1 and 2 includes a rigid shell 12 defining a generally cylindrical bore 14. The rigid shell 12 is preferably formed of conventional injection moldable thermoplastic materials illustratively including polyethylene, polyamides, polycarbonates, and polyvinyls. The bore 14 is sized to accommodate an oversize beverage bottle or cup. Preferably, the bore 14 has a diameter of between about 3 and 5 inches. The bore 14 has an aperture 16 along the height of the bore 14. Preferably, the aperture 16 is radial about the shell inner wall 17 defining the bore 14. The present invention is concerned with using an air pressurized bladder to protrude through the radial aperture 16 so as to grip any beverage container inserted within the bore 14 firmly and without inducing crushing thereof. A flexible annular bladder 18 is fit within the rigid thermoplastic shell 14 so as to be aligned with the radial aperture 16. Flexible bladder 18 is retained in the rigid shell 12 with stays 19 molded into the shell 12 or with an adhesive (not shown) illustratively including a pressure sensitive and thermal adhesive. The bladder 18 is preferably made from a viscoelastic material such as rubber and preferably latex rubber. It is appreciated that other materials such as vinyl or other structural layers that are impervious to air and readily expandable are also operative herein. An inflation device 20 is integrated into the rigid shell 12. The inflation device 20 includes a bellows that urges a charge of air through a one-way valve 24. The charge of air passing through the one-way valve 24 then enters and expands the volume of bladder 18. While a manually activated bellows is contemplated, it is appreciated that a bellows is obviated by the use of a vehicle compressed air source. Owing to the rigidity of the shell 12, inflation of the bladder 18 causes the bladder to protrude through the radial aperture 16 thereby reducing the base diameter 14. In this way, a cup or beverage container inserted within the bore 14 is brought into firm contact with the pressurized bladder 18. Preferably, the bladder 18 is fitted with a pressure release valve 26 to prevent over-inflation of the bladder 18 and the resulting crush deformation of a cup or beverage holder within the bore 14. Upon attaining a preselected pressure, the pressure release valve 26 includes a one-way valve and an air release diaphragm (not shown). Depressing the air release diaphragm bleeds air from the bladder 18 in order to disengage the bladder 18 from a cup or beverage container within the bore 14.

It is appreciated that other bladder configurations and pressurizing systems are also operative herein to inflate a bladder. For example, it is appreciated that a bladder need not exert a uniform radial external pressure on a cup within a cup holder of the present invention but rather an asymmetric force exerted on a cup by a differently shaped bladder is likewise operative herein. Additionally, an ancillary or existing vehicle air compressor is appreciated to be operative herein in order to pressurize a given bladder.

Optionally, the radial aperture 16 is covered by an elastic and puncture-resistant sheet material 32 adapted to expand under the force exerted by an inflated bladder 18. The sheet material 32 is intended to protect the bladder 18 from inadvertent puncture and further to facilitate cleaning of the cup holder 10. The sheet material 32 illustratively includes rubber, vinyl, and nylon.

Figure 3:
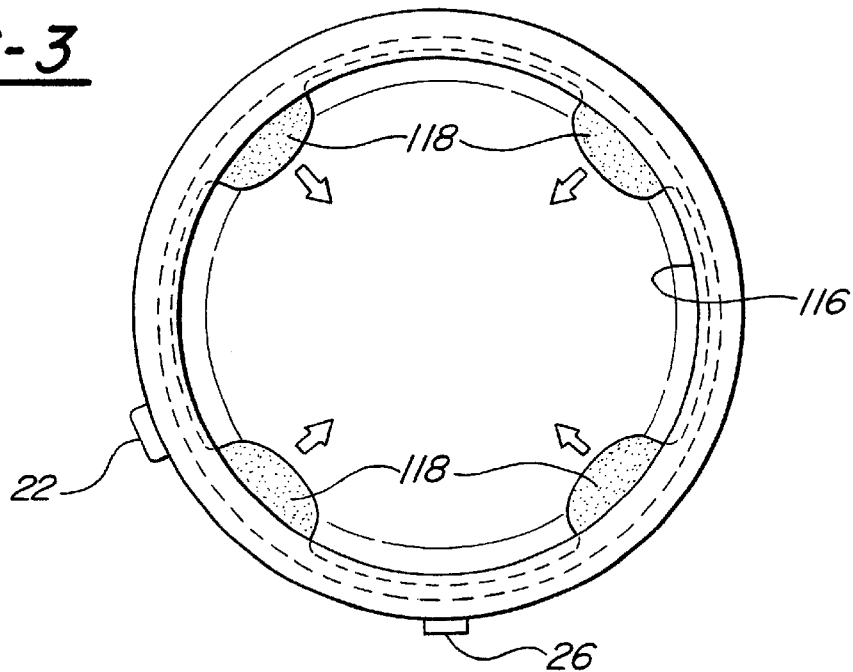
FIG. 3 is a top view of another embodiment according to the present invention.

An embodiment of the present invention depicted in FIG. 3 utilizes multiple separate bladders 118 in fluid communication through a non-expandable tube 120. The elements of this embodiment are otherwise unchanged from those depicted in FIGS. 1 and 2 with the exception of a cut 116 within the cylindrical bore 14 being segmented to accommodate each of the individual bladders 118.

Figure 4:
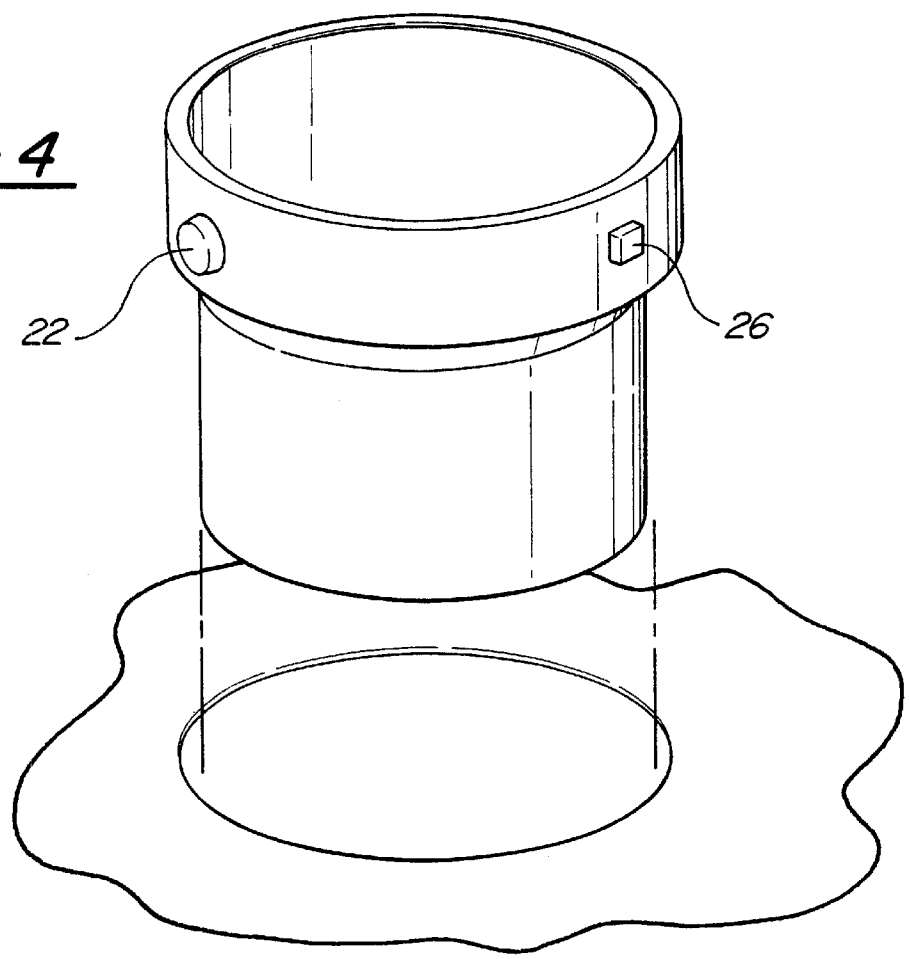
FIG. 4 is still another embodiment of the present invention particularly well adapted for retrofitting the present invention into a conventional recessed annulus cup holder.

The embodiment of FIG. 4 is particularly well adapted to insert within a conventional annular bore cup holder and thereby provide a retrofit adjustability to accommodate an array of cup or beverage container sizes. The embodiment of the present invention depicted in FIG. 4 is otherwise similar to that depicted in FIG. 1 with the exception that the rigid shell has an outer wall adapted to engage a recess within a vehicle, such as a conventional cup holder, compartment, or cut out, and encompass a variety of containers, the container being selectively secured by inflation of a bladder against the outer walls of the container. Preferably, the outer wall of the shell inserts within the depression of a conventional cup holder. More preferably, the outer wall flares to a larger diameter than the recess in order to accommodate a wider variety of beverage containers within the inventive bore.

It is appreciated that the relative location of inventive components illustratively including the inflator device, radial cut, and pressure release valve are readily modified. These modifications are intended to fall within the scope of the present invention.

What is claimed is:

1. A cup holder comprising:
    a shell having a rigid outer wall and a rigid inner wall defining an internal bore, the inner wall having an aperture therein;
    an inflatable bladder between the outer wall and the inner wall, the bladder adjacent to the aperature, said bladder extending through the aperture into the bore upon pressurization; and
    an inflation device for pressurizing said bladder.

2. The cup holder of claim 1 wherein said aperture is a radial cut.

3. The cup holder of claim 1 wherein said inflation device comprises a bellows and a one-way valve.

4. The cup holder of claim 1 further comprising a pressure release valve in fluid communication with said bladder.

5. The cup holder of claim 2 wherein said inflatable device comprises a manually activated bellows and one way valve.

6. The cup holder of claim 1 further comprising a sheet material covering the aperture.

7. The cup holder of claim 1 wherein the bore is cylindrical.

8. The cup holder of claim 7 wherein the bore has a diameter of between 3 and 5 inches.

9. The cup holder of claim 1 further comprising a plurality of said bladders.

10. A cup holder comprising:
    a shell, having a rigid outer wall and a rigid inner wall, the outer wall adapted to engage a recess and the inner wall defining an internal bore, the bore having an edge, the inner wall having an aperture therein; an inflatable bladder between the outer wall and the inner wall, the bladder adjacent to the aperture, said bladder extending through the aperture into the bore upon pressurization; and an inflation device for pressurizing said bladder.

11. The cup holder of claim 10 wherein the outer wall of said shell flares adjacent to the bore edge.

12. The cup holder of claim 10 wherein said aperture is a radial cut.

13. The cup holder of claim 10 wherein said inflation device comprises a bellows and a one-way valve.

14. The cup holder of claim 10 further comprising a pressure release valve in fluid communication with said bladder.

15. The cup holder of claim 12 wherein said inflatable device comprises a manually activated bellows and one way valve.

16. The cup holder of claim 10 further comprising a sheet material covering the aperture.

17. The cup holder of claim 10 further comprising a plurality of said bladders.

18. The cup holder of claim 17 wherein the bore has a diameter of between 3 and 5 inches.

19. The cup bolder of claim 1 wherein said inflation device is located within said shell.

20. The cup bolder of claim 10 wherein said inflation device is located within said shell.

* * * * *